(12) United States Patent
Abu-Khamsin et al.

(10) Patent No.: US 11,441,396 B1
(45) Date of Patent: Sep. 13, 2022

(54) SAND CONSOLIDATION FOR SUBTERRANEAN SAND FORMATIONS

(71) Applicant: King Fahd University of Petroleum and Minerals, Dhahran (SA)

(72) Inventors: Sidqi Ahmad M Abu-Khamsin, Dhahran (SA); Mohamed Ahmed Nasr Eldin Mahmoud, Dhahran (SA); Saad Fahaid Khalaf Al-Afnan, Dhahran (SA); Murtada Saleh Hassan Al-Jawad, Dhahran (SA); Ahmed Hamdy Gowida, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 17/724,052

(22) Filed: Apr. 19, 2022

Related U.S. Application Data

(60) Provisional application No. 63/276,205, filed on Nov. 5, 2021.

(51) Int. Cl.
  *E21B 43/02* (2006.01)
  *C09K 8/565* (2006.01)
  (Continued)

(52) U.S. Cl.
  CPC ............ *E21B 43/025* (2013.01); *C09K 8/565* (2013.01); *C09K 8/592* (2013.01); *C09K 8/594* (2013.01); *E21B 43/166* (2013.01)

(58) Field of Classification Search
  CPC .... E21B 43/025; E21B 43/166; E21B 43/168; E21B 43/02; C09K 8/56; C09K 8/565;
  (Continued)

(56) References Cited

U.S. PATENT DOCUMENTS 3,217,800 A * 11/1965 Smith .................. E21B 43/243
                                                        166/260
3,974,877 A *  8/1976 Redford ................ E21B 43/04
                                                        166/276

(Continued)

FOREIGN PATENT DOCUMENTS

CN      102128016 A     7/2011
WO   2019/240627 A1   12/2019

OTHER PUBLICATIONS

Dong ; Laboratory Experimental Research on Promoting Aquathermolysis of Heavy Oil with the NaNO2/NH4Cl Exothermic System ; Advanced Materials Research, vol. 772, pp. 297-302 ; 2013.

(Continued)

*Primary Examiner* — Angela M DiTrani Leff
(74) *Attorney, Agent, or Firm* — Oblon, McClelland, Maier & Neustadt, L.L.P.

(57) ABSTRACT

A method of sand consolidation is provided. The method includes injecting a consolidating fluid into a subterranean sand formation via a wellbore to saturate a portion of the subterranean sand formation in a target region surrounding the wellbore and displace a formation fluid present in the subterranean sand formation. Herein, the consolidating fluid comprises bitumen dissolved in an aromatic solvent. The method further includes injecting a composition comprising one or more heat-generating chemicals into the subterranean sand formation such that the portion of the subterranean sand formation in the target region is heated to a target temperature of at least 150° C. The method further includes injecting a gas comprising oxygen into the subterranean sand formation for a period sufficient to oxidize the bitumen in the target region into a residue present on sand grains to bind the sand grains together into a consolidated permeable (Continued)

matrix. A volume fraction of the residue in the consolidated permeable matrix in the target region is about 5-30%.

17 Claims, 9 Drawing Sheets

(51) Int. Cl.
*E21B 43/16* (2006.01)
*C09K 8/594* (2006.01)
*C09K 8/592* (2006.01)

(58) Field of Classification Search
CPC .......... C09K 8/592; C09K 8/594; C09K 8/57; C09K 8/572; C09K 8/575; C09K 5/5751; C09K 8/5753; C09K 8/5755
See application file for complete search history.

(56) References Cited

U.S. PATENT DOCUMENTS

| | | | |
|---|---|---|---|
| 4,482,016 A | | 11/1984 | Richardson |
| 4,494,605 A | * | 1/1985 | Wiechel ................ E21B 43/025 166/276 |
| 6,364,019 B1 | * | 4/2002 | Aggour .................. C09K 8/565 166/300 |
| 2018/0273829 A1 | | 9/2018 | Al-Nakhli et al. |

OTHER PUBLICATIONS

Mishra, et al. ; Application of an improvised inorganic-organic chemical mixture to consolidate loose sand formations in oil fields ; Journal of Petroleum Science and Engineering 137 ; pp. 1-9 ; Nov. 11, 2015.

\* cited by examiner

SAND CONSOLIDATION FOR SUBTERRANEAN SAND FORMATIONS

CROSS-REFERENCE TO RELATED APPLICATIONS

The present application claims benefit of priority to U.S. Provisional Application No. 63/276,205 having a filing date of Nov. 5, 2021 and which is incorporated herein by reference in its entirety.

BACKGROUND

Technical Field

The present disclosure is directed to in-situ sand consolidation for subterranean sand formations surrounding a wellbore, and more particularly to a method for sand consolidation for treating subterranean incompetent formations and production enhancement from the wellbore.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Sand production refers to migration of sand grains and fine particles from a subsurface, poorly-consolidated formation into a wellbore and further to the surface while producing fluids, such as hydrocarbons or water, from the formation. Solid particles flowing with the produced fluids cause severe damage to the surface and sub-surface production equipment in addition to flow restriction and downhole accumulation of sand and other solid matter. Many sand control techniques, both chemical and mechanical, have been employed by the industry with varying degrees of success. However, most of the existing techniques have several technical and economical limitations.

For instance, mechanical systems have several drawbacks even when they are successfully installed. Since the formation sand is still free to flow, it may plug these systems and thus cause a significant loss in the near-wellbore productivity. Therefore, such systems usually require frequent remedial and repairing operations. For chemical methods, such as plastic consolidation systems, many difficulties may be encountered, which vary in terms of resin placement, achieving effective polymerization of the consolidating material to effectively bind the sand grains, or retaining sufficient matrix permeability. Besides, most of the existing resinous materials are quite expensive.

U.S. Pat. Nos. 3,910,351 A and 4,494,605 A disclose methods for treating subterranean sand formations using high asphaltic-content petroleum. To achieve injectivity, the bituminous material is first heated to about 150° C. before injection into the poorly-consolidated sand formation. This is followed by the injection of asphalt-precipitating solvent to solubilize non-asphaltic fractions of the petroleum saturating the sand and precipitate the asphaltic or bituminous portions of the petroleum. Thereafter, steam or heated air of at least 150° C. is injected to solidify the precipitated material and consolidate the sand grains into a solid matrix. Therefore, the application of these two methods requires surface heating of the consolidating fluid and other injectants or heating the formation using surface-generated steam, which may incur surface and wellbore heat losses.

U.S. Pat. No. 6,364,019 B1 discloses a method for in-situ consolidation of incompetent sand formations using low-temperature oxidation (LTO) of a hydrocarbon-based fluid. The fluid is a 40% by weight solution of asphaltenes in an aromatic solvent. Following placement of a slug of the fluid in the formation, air is injected into the formation for a sufficient time to oxidize the asphaltenes at the formation temperature and form a consolidated sand zone around the wellbore. While the method as disclosed in this reference produces consolidated sand with high compressive strength and low permeability loss, it requires a relatively long time for the completion of the process of between about 24 and 72 hours depending on the formation temperature. This makes it less applicable to relatively cool formations and reduces its cost effectiveness.

US Patent Publication No. 20180273829 A1 discloses a sand consolidation method including decreasing a viscosity of a petroleum product to yield a consolidating material, providing the consolidating material to a subterranean formation, and consolidating sand in the subterranean formation with the consolidating material to yield a consolidated region in the subterranean formation. While this reference teaches that decreasing the viscosity of a petroleum product may include heating the petroleum product by an exothermal reaction involving ammonium- and nitrite-based compounds, but it does not teach that sand consolidation is achieved by heat generated in situ.

CN Patent Publication No. 102128016 A discloses a method for improving solidification strength of resin sand. The method includes, after constructing a sand prevention wall, respectively infusing $NH_4Cl$ solution, slug isolating solution and $NaNO_2$ solution added with acid catalyst; and after mixing the two heating medicines at a bottom layer, performing heating reaction to generate a lot of heat to completely solidify the resin sand at high-temperature environment. It may be noted that this reference describes improving solidification strength after constructing a sand prevention wall for improving resin sand curing strength by using the heat generated by the used chemicals, but does not teach that the added chemicals are mixed at a bottom layer or around the wellbore for accelerating sand consolidation.

U.S. Pat. No. 4,482,016 A discloses a well treating process including flowing a self-reactive aqueous liquid solution into contact with materials in or around a borehole. The solution includes a heat and nitrogen generation aqueous solution (e.g., $NH_4Cl$ and $NaNO_2$) and at least one of a weak acid and a weak acid salt. The process described in this reference aims to acidify the borehole, but does not explicitly teach about sand consolidation. Moreover, this reference discloses that the self-reactive aqueous liquid solution (containing $NH_4Cl$, $NaNO_2$ and acid) is directly flown to be in contact with materials in and around a well, which may result in premature reaction and heat generation therefrom.

Each of the aforementioned references suffers from one or more drawbacks hindering their adoption. None of the references teach about accelerating the process of sand consolidation for subterranean sand formations surrounding a wellbore, or explicitly mentions that the chemical mixtures being used is employed for the said purpose directly or indirectly. Accordingly, it is one object of the present disclosure to provide a method for sand consolidation using a chemical mixture for generating heat in situ to accelerate and thereby shorten the duration of the treatment for consolidating sand material.

SUMMARY

In an exemplary embodiment, a method of sand consolidation is provided. The method includes injecting a consolidating fluid into a subterranean sand formation via a wellbore to saturate a portion of the subterranean sand formation in a target region surrounding the wellbore and displace a formation fluid present in the subterranean sand formation. Herein, the consolidating fluid comprises bitumen dissolved in an aromatic solvent. The method further includes injecting a composition comprising one or more heat-generating chemicals into the subterranean sand formation such that the portion of the subterranean sand formation in the target region is heated to a target temperature of at least 150° C. The one or more heat-generating chemicals reduces the consolidating fluid's saturation in the target region. The method further includes injecting a gas comprising oxygen into the subterranean sand formation for a period sufficient to oxidize the bitumen in the target region into a residue present on sand grains of the subterranean sand formation to bind the sand grains together into a consolidated permeable matrix. Herein, a volume fraction of the residue in the consolidated permeable matrix in the target region is about 5-30%

In one or more exemplary embodiments, the composition (e.g. injected chemicals) comprises ammonium and nitrite. The method further includes injecting an acidic activator that is configured to activate an exothermal reaction between the ammonium and nitrite. In an embodiment, the ammonium and nitrite are injected into the subterranean sand formation to form a mixture therein. Further, the acidic activator is injected into the mixture. In another embodiment, the ammonium and nitrite are injected into the subterranean sand formation in batches to form batches of mixtures. Further, the acidic activator is injected into each batch of mixtures. In still other embodiment, the ammonium and nitrite are injected separately into the subterranean sand formation. Further, the acidic activator is pre-mixed with one of the ammonium and nitrite before injecting into the subterranean sand formation.

In one or more exemplary embodiments, the acidic activator comprises acetic acid. In an embodiment, the acidic activator has a concentration of 7-13% by volume of a total volume of the ammonium and the nitrite.

In one or more exemplary embodiments, the ammonium comprises ammonium chloride, and the nitrite comprises sodium nitrite. In an embodiment, the ammonium comprises 2-4 mol/L ammonium chloride. Further, the nitrite comprises 2-4 mol/L sodium nitrite.

In one or more exemplary embodiments, permeability of the subterranean sand formation is reduced by less than 20% after injecting the consolidation fluid, the composition and the gas in comparison to the permeability of the subterranean sand formation before injecting the consolidation fluid, the composition and the gas.

In one or more exemplary embodiments, the consolidating fluid comprises about 30-50 grams of asphaltenes per 100 milliliters of the aromatic solvent. In an embodiment, the aromatic solvent comprises toluene or xylene.

In one or more exemplary embodiments, the target region extends radially from the wellbore to the subterranean sand formation by up to 4 feet.

In one or more exemplary embodiments, the period for injecting the gas is about 6-10 hours.

In one or more exemplary embodiments, the injecting the composition comprises injecting 6-8 bbl of the heat-generating chemicals per each foot of a thickness of the subterranean sand formation.

In one or more exemplary embodiments, prior to the injecting the consolidating fluid into the subterranean sand formation, the method further includes flushing the target region with a mutual solvent to at least partially remove the formation fluid from the target region. Herein, the formation fluid comprises water, crude oil, gas or a combination thereof. Further, herein, the subterranean sand formation comprises carbonate minerals.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
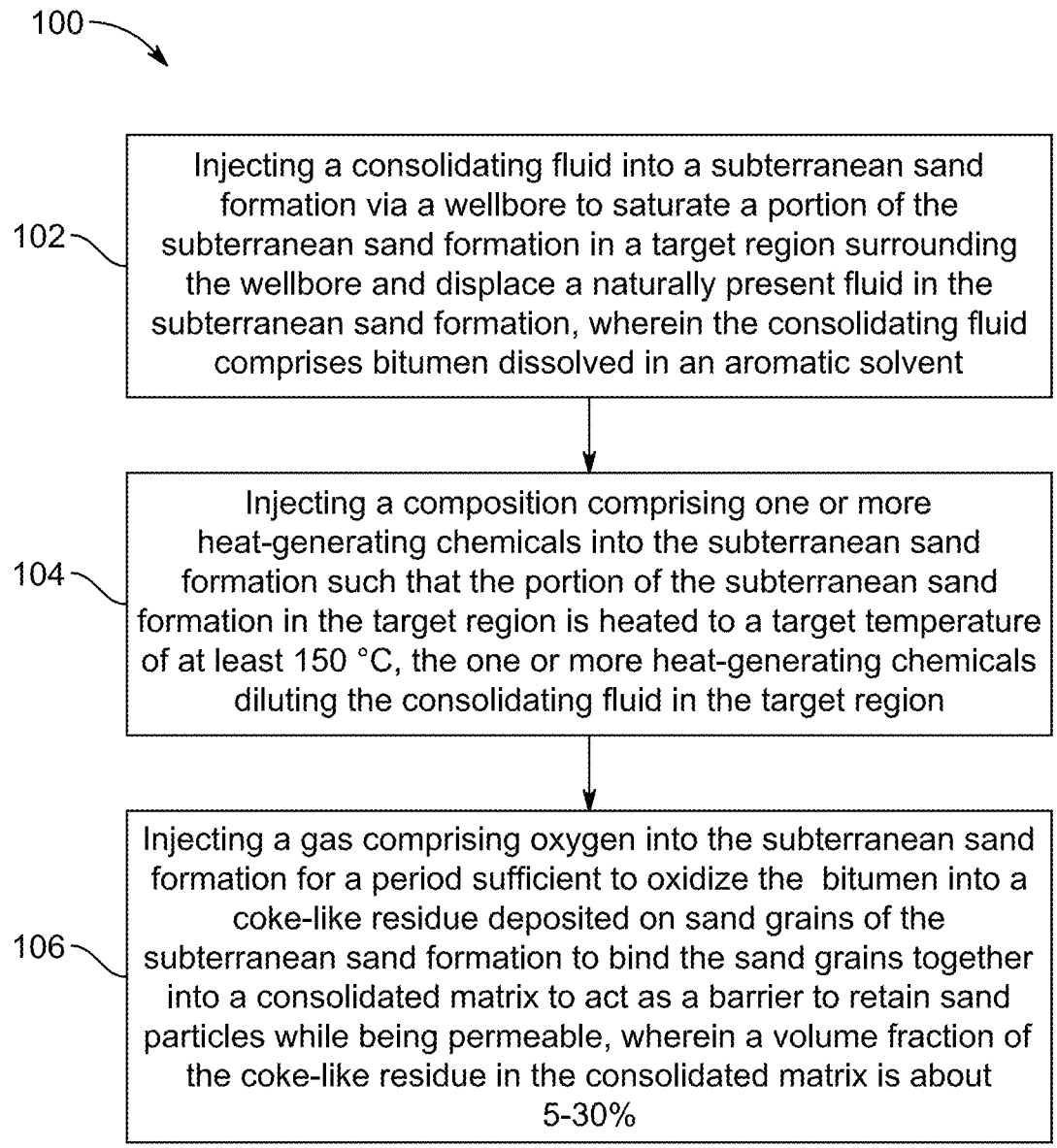
FIG. 1 is an exemplary flowchart of a method of sand consolidation, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Conventional techniques for consolidating sand grains in the vicinity of a wellbore into a solid sand matrix that acts as a highly permeable barrier to restrain sand flow use low-temperature oxidation (LTO) of a hydrocarbon-based fluid to form a coke-like residue that binds the sand grains into a solid sand body. The hydrocarbon-based fluid consists of asphaltene-rich material dissolved in an aromatic solvent such as toluene or xylene at a concentration of at least 40% by weight. Following placement of a slug of the fluid in the formation, air is injected into the formation for a sufficient time to oxidize the asphaltenes at the formation temperature and form a consolidated sand zone around the wellbore. While conventional techniques produce consolidated sand with high compressive strength and low permeability loss, a relatively long time is required for the completion of the process, e.g., between about 24 and 72 hours depending on the formation temperature. This makes it less applicable to relatively cool formations and reduces its cost effectiveness.

Aspects of this disclosure are directed to a method of sand consolidation. The present disclosure provides an improved form of a sand-control technique for treating poorly-consolidated, subterranean formations. Accordingly, an objective of the present disclosure is to accelerate the sand-consolidation treatment in order to shorten implementation time and improve economics. The present disclosure provides an improved method of sand consolidation for treating poorly-consolidated, subterranean formations. The present disclosure introduces a marked improvement to wellbore preheating, e.g., by injecting heat-generating chemicals therein. The in-situ-generated heat by use of the heat-generating chemicals in the present disclosure accelerates the oxidation process and, accordingly, shortens the consolidation time so that the field application of the present method can be practically implemented in a cost-effective manner.

Referring to FIG. 1, illustrated is an exemplary flowchart of a method (represented by reference numeral 100) of sand consolidation, according to certain embodiments. The method 100 pertains to a sand control technique which involves consolidating the sand particles surrounding a wellbore into a solid permeable matrix to restrain the movement of the sand grains detached during hydrocarbon and/or water production. The present method 100 shortens the duration of the consolidation treatment by generating heat in situ to accelerate the process and deposit more consolidating material and, thus, increases its quality and cost effectiveness. The present method 100, thereby, provides production enhancement from subsurface hydrocarbon or water reservoirs.

Figure 2:
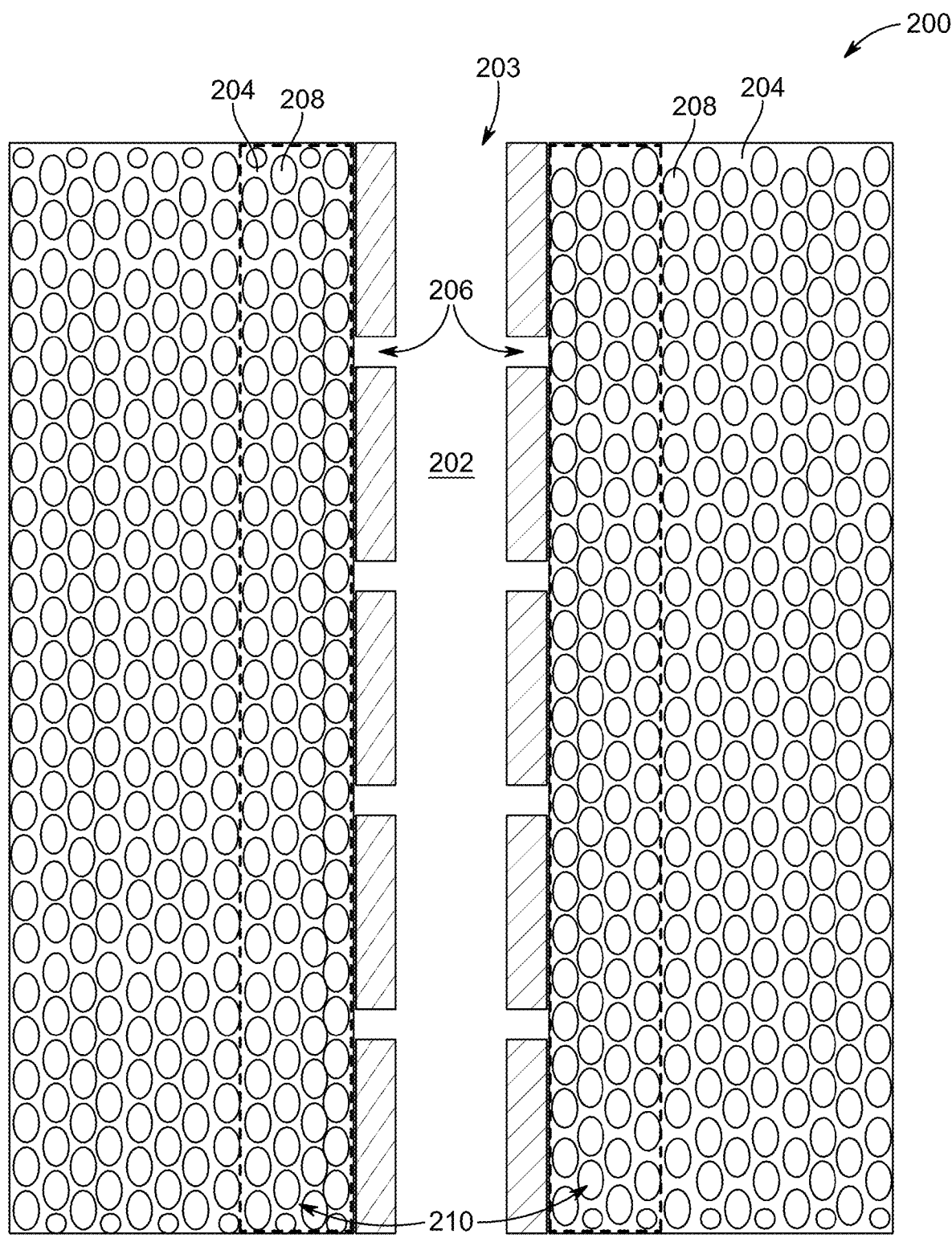
FIG. 2 is an exemplary depiction of a subterranean sand formation with a wellbore, according to certain embodiments.

FIG. 2 is an exemplary depiction of a subterranean sand formation 200, according to certain embodiments. As illustrated, the subterranean sand formation 200 includes a wellbore 202 with a surface opening 203. The wellbore 202 may be formed in the subterranean sand formation 200 by known techniques. The wellbore 202 is drilled in the subterranean sand formation 200 to aid in the exploration and extraction of a formation fluid (also known as "naturally present formation fluids" and generally represented by reference numeral 204) from the subterranean sand formation 200 for a period of time. In one or more examples, the formation fluid 204 comprises water, crude oil, gas or a combination thereof. In other words, the subterranean sand formation 200 may be processed to produce water, crude oil, gas, or a mixture of these fluids. For extraction of the formation fluid 204, the wellbore 202 may be provided with multiple perforations (as represented by reference numeral 206). These perforations 206 may be in the form of a hole (openings) formed in a casing or liner of the wellbore 202 to create channels for allowing flow of the formation fluid 204 from the subterranean sand formation 200 into the wellbore 202 (from extraction thereof, as desired). It may be appreciated that the perforations 206 may be formed uniformly or non-uniformly along a length of the wellbore 202 without any limitations.

In some examples, the perforations 206 are equidistantly spaced at a distance of 0.1-1.0 m, preferably 0.2-0.9 m, preferably 0.3-0.8 m, preferably 0.4-0.7 m, in a vertical direction along a depth of the wellbore 202 or the opening 203. When the wellbore 202 has a diameter of 45-80 cm, preferably 50-75 cm, preferably 55-70 cm, a number of (e.g. three, four, five, six. etc.) perforations 206 may be evenly spaced radially (along a circumference of the wellbore 202) at each depth. The perforations 206 may be in the form of openings and have various shapes (rectangular, circular, elliptical, etc.). The openings can have a dimension of 10-50 cm, preferably 20-40 cm, preferably 25-35 cm. In one example, the perforations 206 are aligned in the vertical direction. In another example, the perforations 206 can be staggered in the vertical direction, e.g. in order to more uniformly inject fluids into the wellbore 202.

In one or more examples, the subterranean sand formation 200 includes carbonate minerals (as represented by reference numeral 208). These carbonate minerals 208 may include, for example, calcite and dolomite in its mineral composition. The subterranean sand formation 200 with the carbonate minerals 208 may generally have unconsolidated (weak) sandstone formation, which in turn hampers extraction of the formation fluid 204 from the subterranean sand formation 200 (as desired) due to sand production phenomenon. As discussed, sand production can cause migration of sand grains and fine particles from a subsurface, poorly-consolidated formation into the wellbore (such as, the wellbore 202) and further to the surface while extracting the formation fluid 204 from the subterranean sand formation 200 (if sand consolidation is not performed). Excessive or uncontrolled sand production may erode subsurface equipment, wear surface production facilities, increase production cost, cause sudden choking of wells and create down-hole cavities leading to closure of an entire field.

For preventing sand production, sand particles (e.g. the carbonate minerals 208) in a region surrounding the wellbore 202 may need to be consolidated. It has been found that there is a need to consolidate the sand particles in a region extending radially from the wellbore 202 to the subterranean sand formation 200 by about a few feet. Such a region has been referred to as a "target region" for purposes of the present disclosure and has been referred to by reference numeral 210. In an example, the target region 210 extends radially from the wellbore 202 to the subterranean sand formation 200 by up to about 4 feet, preferably up to about 3 feet, up to about 2 feet, preferably 1-2 feet or 3-4 feet. It may be contemplated that the target region 210 may be defined to be narrower or wider depending on the subterranean sand formation 200, or specifically geographical location of the subterranean sand formation 200; for example, regions such as U.S Gulf Coast, North Sea, China, Canada, Venezuela, Western Africa, Indonesia, Malaysia and the like which prominently face the sand production issue may generally, but not necessarily, need to define wider target region 210 therefor.

The present method 100 allows for control of the sand production and/or other solid particles from wells penetrating poorly-consolidated, subterranean formations by sand consolidation to form a region of solid sand matrix surrounding the wellbore 202 and acting as a barrier to restrain the movement of the sand grains while the formation fluid 204 from the subterranean sand formation 200 may be extracted. The method 100 include multiple stages which are described as steps of the method 100 hereinafter. It may be appreciated that the steps described in the proceeding paragraphs in reference to the method 100 are only illustrative, and other alternatives may also be provided where one or more steps are added and/or modified without departing from the spirit and the scope of the present disclosure.

Referring again to FIG. 1, at step 102, the method 100 includes injecting a consolidating fluid into the subterranean sand formation 200 via the wellbore 202 to saturate a portion of the subterranean sand formation 200 in the target region 210 surrounding the wellbore 202 and displace the formation fluid 204 present in the subterranean sand formation 200. Herein, the use of the consolidating fluid helps with preparing the subterranean sand formation 200 to be further processed (as described in the subsequent paragraphs) for consolidation of the loose sand particles therein.

Figure 3:
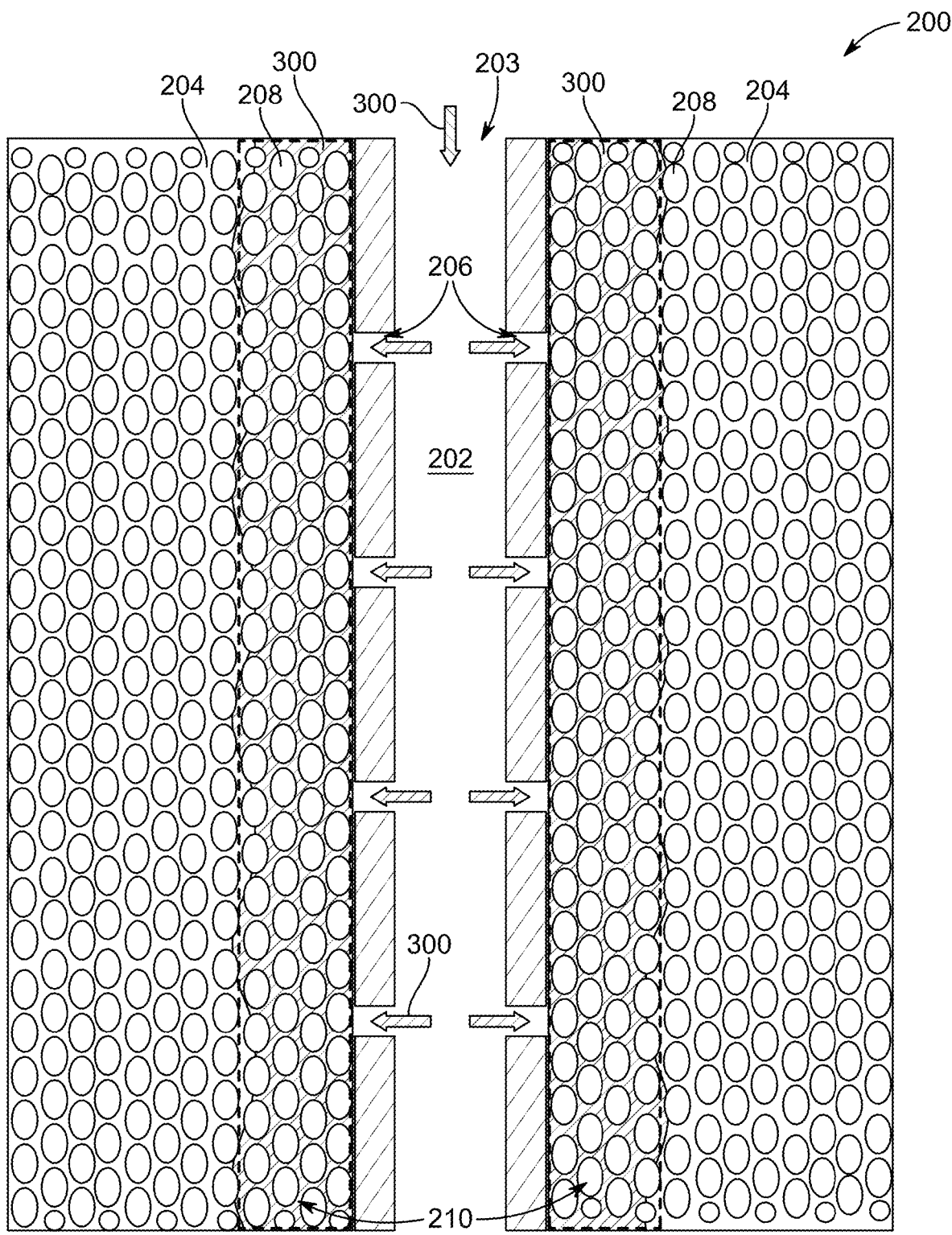
FIG. 3 is an exemplary depiction of the subterranean sand formation with a consolidating fluid being injected in the wellbore, according to certain embodiments.

FIG. 3 is an exemplary depiction of the subterranean sand formation 200 with the consolidating fluid (depicted as arrows and represented by the reference numeral 300) being injected in the wellbore 202, according to certain embodiments. As illustrated in FIG. 3, the consolidating fluid 300 may be injected into the subterranean sand formation 200 through the surface opening 203 of the wellbore 202. Further, as illustrated in FIG. 3, injecting the consolidating fluid 300 into the subterranean sand formation 200 (i.e., into the incompetent sand formation) can lead to saturation of the target region 210 (i.e., a near-wellbore region) due to flow of the consolidating fluid 300 from the wellbore 202, via the perforations 206 therein, into the subterranean sand formation 200. In particular, the consolidating fluid 300 reaches a pore space of the target region 210 surrounding the wellbore 202. This, in turn, may displace the formation fluid 204 away from the wellbore 202 and deeper into the subterranean sand formation 200 (as shown in FIG. 3).

Herein, the consolidating fluid 300 includes bitumen dissolved in an aromatic solvent. In the present examples, the bitumen may be replaced by any suitable asphalt-rich material, or, in general, asphaltenes. The consolidating fluid 300 is prepared by dissolving the asphalt-rich material in the aromatic solvent. In one or more examples, the consolidating fluid 300 includes about 30-50 grams, preferably 35-45 grams, of asphaltenes per 100 milliliters of the aromatic solvent. In an example, the consolidating fluid 300 contains about 40 grams of asphaltenes per 100 milliliters of the aromatic solvent. In one or more examples, the aromatic solvent includes toluene or xylene. Such aromatic solvent are employed as these allow for proper dissolution of the bitumen (and, the said asphalt-rich material, asphaltenes, and the like) therein. In other examples, the consolidating fluid 300 may be a native reservoir oil which contains an appropriate concentration of asphaltene, preferably aged native oil which has increased concentration of heavy ends due to the aging process. For example, asphaltene content in crude petroleum and petroleum products can be determined using a test method such as ASTM D6560-17.

In an aspect of the present disclosure, prior to the injecting the consolidating fluid 300 into the subterranean sand formation 200, the method 100 further includes flushing the target region 210 with a mutual solvent to at least partially remove the formation fluid 204 from the target region 210. Such a mutual solvent may be a chemical additive that is soluble in oil, water and acid-based treatment fluids. Typically, the mutual solvent is miscible with both aqueous and oleaginous fluids. Thereby, use of the mutual solvent, prior to the injecting the consolidating fluid 300, helps with dissolution of the formation fluid 204, especially heavy hydrocarbon deposits, therein, which may then be, comparatively, easily displaced by injection of the consolidating fluid 300 (as discussed in the preceding paragraph). In some examples, the mutual solvent also helps with controlling the wettability of contact surfaces before, during or after a treatment; and preventing or breaking emulsions. A commonly used mutual solvent is ethylene-glycol-mono-butyl-ether, also known as EGMBE.

Referring again to FIG. 1, at step 104, the method 100 includes injecting a composition comprising one or more heat-generating chemicals into the subterranean sand formation 200 such that the portion of the subterranean sand formation 200 in the target region 210 is heated to a target temperature of at least 150° C., preferably 160-220° C., preferably 180-200° C. The composition comprising the one or more heat-generating chemicals further dilutes the consolidating fluid 300 in the target region 210. Such in-situ generated heat raises a temperature of the target region 210 to levels much higher than a natural temperature of the subterranean sand formation 200. The elevated temperature of the target region 210 may help accelerate a subsequent oxidation process (as discussed later in the description) and, hence, shorten the consolidation treatment process, which is desirable. Moreover, the composition with the one or more heat-generating chemicals reduces the saturation of the consolidating fluid 300 in the target region 210 to low levels, which ensures high retention of the permeability of the target region 210 after the treatment.

Figure 4:
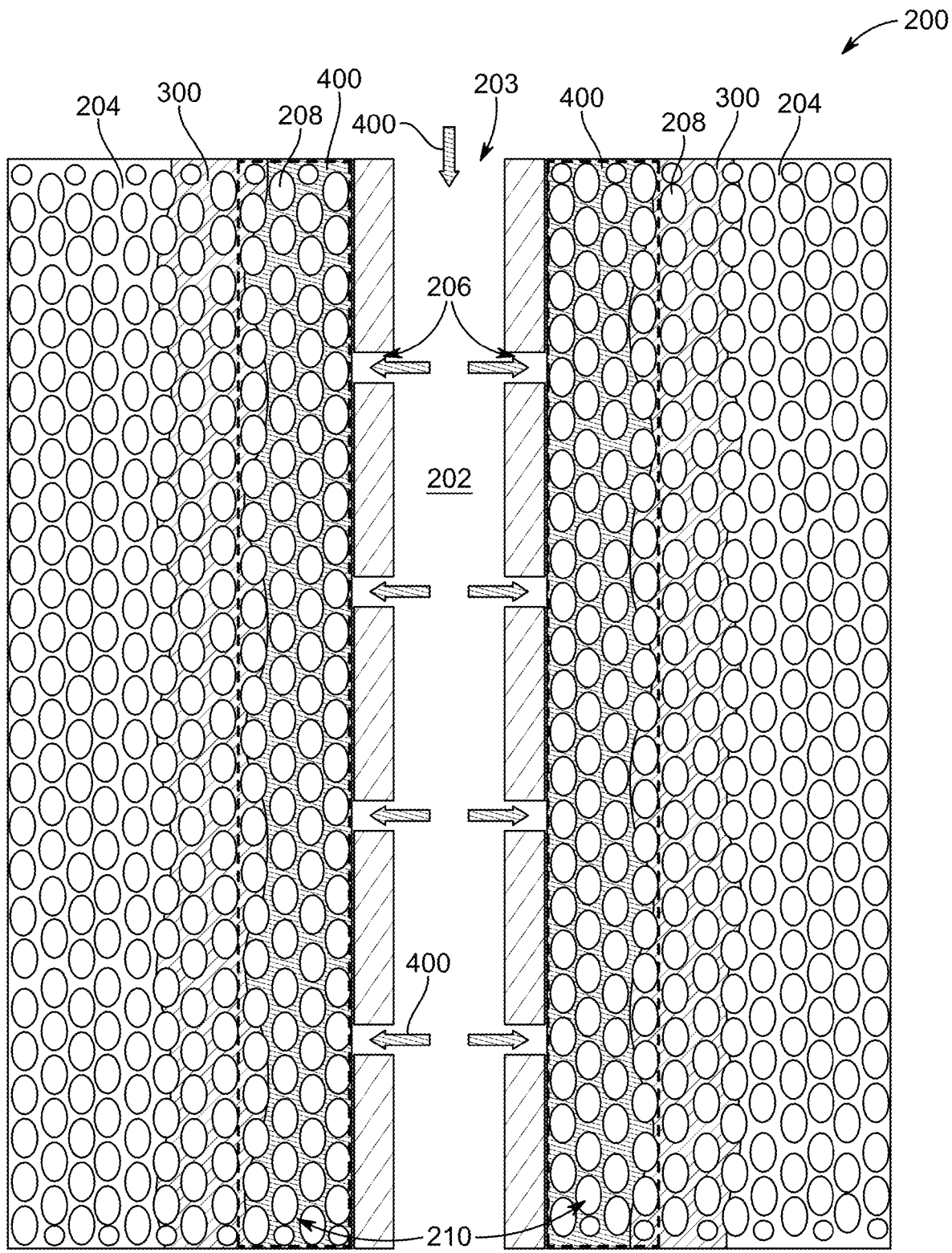
FIG. 4 is an exemplary depiction of the subterranean sand formation with a composition including one or more heat-generating chemicals being injected in the wellbore, diluting the previously injected consolidating fluid therein, according to certain embodiments.

FIG. 4 is an exemplary depiction of the subterranean sand formation 200 with the composition (depicted as arrows and represented by the reference numeral 400) being injected in the wellbore 202, according to certain embodiments. As illustrated in FIG. 4, the composition 400 may be injected into the subterranean sand formation 200 through the surface opening 203 of the wellbore 202. Further, as illustrated in FIG. 4, injecting the composition 400 into the subterranean sand formation 200 leads to dilution of the consolidating fluid 300 in the target region 210 due to flow of the composition 400 from the wellbore 202, via the perforations 206 therein, into the subterranean sand formation 200. In an example, the injection of the composition 400 into the subterranean sand formation 200 may reduce the saturation of the consolidating fluid 300 in the target region 210 down to or close to its residual saturation by displacing an excessive portion of the consolidating fluid 300 more deeply into the subterranean sand formation 200. In particular, the composition 400 reaches the pore space of the target region 210 surrounding the wellbore 202 to dilute the consolidating fluid 300 present in the target region 210 so that the consolidating fluid 300 goes deeper into the subterranean sand formation 200, which in turn may displace the previously displaced formation fluid 204 even deeper into the subterranean sand formation 200 (as shown in FIG. 4).

As discussed, the composition 400 including the one or more heat-generating chemicals (also sometimes referred to as "thermochemicals" hereinafter) is used to generate heat energy into the subterranean sand formation 200 such that the portion of the subterranean sand formation 200 in the target region 210 is heated to the target temperature of at least 150° C. In the present examples, the one or more heat-generating chemicals are selected to generate heat energy released from an exothermic chemical reaction. In some examples, the one or more heat-generating chemicals include one or more redox reactants that exothermically react to generate heat energy. Suitable redox reactants include urea, sodium hypochlorite, ammonium containing compounds, and nitrite containing compounds. In the present examples, the one or more heat-generating chemicals in the composition 400 includes ammonium and nitrite. That is, the one or more heat-generating chemicals include at least one ammonium-containing compound and at least one nitrite-containing compound. Thereby, in aspects of the present disclosure, the injecting the composition 400 includes injecting ammonium and nitrite. In one or more aspects of the present disclosure, the ammonium comprises ammonium chloride ($NH_4Cl$) and the nitrite comprises sodium nitrite ($NaNO_2$). In other examples, the ammonium-containing compound may include chemicals like ammonium bromide, ammonium nitrate, ammonium sulfate, ammonium carbonate, and ammonium hydroxide; and the nitrite-containing compound may include chemical like potassium nitrite, without departing from the spirit and the scope of the present disclosure.

In one or more aspects of the present disclosure, the composition 400 with the ammonium being the ammonium chloride and the nitrite being sodium nitrite, has the ammonium as 2-4 mol/L, preferably 2.5-3.5 mol/L, ammonium chloride and the nitrite as 2-4 mol/L, preferably 2.5-3.5 mol/L, sodium nitrite. In an example, the composition 400 has the ammonium chloride and the sodium nitrite both at about 3 molar concentration (mol/L). Further, the injecting the composition 400 includes injecting 6-8 bbl (barrels), preferably 6.5-7.5 bbl, preferably about 7 bbl, of the heat-generating chemicals per each foot of a thickness of the subterranean sand formation 200. It may be understood that the injection area may be considered as an area of the surface opening 203 of the wellbore 202. It may be appreciated that the given injection volume of the composition 400 may largely depend on porosity of the subterranean sand formation 200, and thus may vary from the given exemplary range without departing from the spirit and the scope of the present disclosure.

Further, injection pressure and injection flow rate may also vary, depending on the subterranean sand formation 200. For example, the injection flow rate of the ammonium chloride is 80-120 gallons per minute, preferably 90-110 gallons per minute, preferably about 100 gallons per minute. The injection flow rate of the sodium nitrite is 80-120 gallons per minute, preferably 90-110 gallons per minute, preferably about 100 gallons per minute. The acetic acid is pre-mixed with one of the ammonium chloride and the sodium nitrite. The injection pressure of the ammonium chloride and the sodium nitrite can be adjusted to satisfy the injection flow rates depending on pressure and permeability of the subterranean sand formation 200. Note that a bottom-hole injection pressure should not exceed a fracture pressure of the subterranean sand formation 200.

In general, with the above-mentioned composition 400, the given range of the injection volume may be sufficient to produce exothermic reaction for generating the required heat energy into the subterranean sand formation 200 such that the portion of the subterranean sand formation 200 in the target region 210 is heated to the target temperature of at least 150° C. In an example, the composition 400 is injected into the subterranean sand formation 200 until the target region 210 is heated to about 180-200° C.

It may be contemplated by a person skilled in the art that in the case of the composition 400 using the ammonium chloride and the sodium nitrite as the one or more heat-generating chemicals, the exothermic reaction for generating heat energy therefrom may need to be triggered. For such a purpose, a pH level of the composition 400 needs to be reduced to below 4. In the aspects of the present disclosure, the method 100 includes injecting an acidic activator that is configured to activate the exothermal reaction between the ammonium and the nitrite. The acidic activator is used to trigger the exothermic reaction by reducing the pH of the medium below 4. In one or more examples, the activator includes acetic acid. The acetic acid acts as a hydrogen-releasing activator to trigger the exothermic reaction between the selected heat-generating chemicals (i.e., the ammonium chloride and the sodium nitrite). In one or more examples, the acidic activator has a concentration of 7-13%, preferably 8-12%, preferably 9-11%, by volume of a total volume of the ammonium and the nitrite. In an example, the acidic activator of the exothermic reaction is added with a concentration of about 10% by volume of the total volume of the thermochemicals. Such a level of concentration may be required for effectively triggering the reaction between the given volume of the ammonium and the nitrite, and thereby efficient generating the heat energy therefrom.

In an aspect of the present disclosure, the ammonium and the nitrite are injected into the subterranean sand formation 200 to form a mixture therein. That is, the heat-generating chemicals of the composition 400 are injected into the subterranean sand formation 200 via the wellbore 202, such that the composition 400 is formed in-situ therein. Thereafter, the acidic activator is injected into the mixture. That is, the acidic activator, such as the acetic acid, is added into the formed composition 400 by being injected into the subterranean sand formation 200 via the wellbore 202. As described in the preceding paragraphs, the addition of the acidic activator results in the initiation of the exothermic reaction, whereby the temperature of the subterranean sand formation 200 rises due to the in-situ generated heat.

In an aspect of the present disclosure, the ammonium and the nitrite are injected into the subterranean sand formation 200 in batches to form batches of mixtures. After each batch of the consolidating fluid 300 has been injected into the subterranean sand formation 200 via the wellbore 202, a respective batch of the thermochemical mixture is injected, the volume of each batch being approximately equal to a pore volume of the target region 210 to be treated. Herein, the pore volume refers to a total volume of very small openings in the subterranean sand formation 200. Following each batch of thermochemical mixture, a suitable quantity of the acidic activator is injected to initiate the exothermic reaction within the target region 210. A short pause can be applied between injection of the thermochemical mixture batches to allow the exothermic reaction to complete and the target region 210 to absorb the generated heat therefrom.

In an aspect of the present disclosure, the ammonium and the nitrite are injected separately into the subterranean sand formation. Such separate injection of the heat-generating chemicals into the subterranean sand formation 200 is done to ensure that a first direct contact therebetween is in the target region 210, and thereby avoid premature reaction therebetween, which would otherwise have dissipated the generated heat from the consequent exothermic reaction and, thus, may have reduced the efficiency of the heating process for the target region 210. In the present aspect, the acidic activator is pre-mixed with one of the ammonium and the nitrite before injecting into the subterranean sand formation 200. That is, the acidic activator is pre-mixed with one of the heat-generating chemicals before being injected into the subterranean sand formation 200, such that when the other one of the heat-generating chemicals is injected into the subterranean sand formation 200, the reaction between the heat-generating chemicals may be initiated.

Referring again to FIG. 1, at step 106, the method 100 includes injecting a gas comprising oxygen into the subterranean sand formation 200 for a period sufficient to oxidize the bitumen into a residue, such as a coke-like residue, deposited or present on sand grains of the subterranean sand formation 200 to bind the sand grains together into a consolidated permeable matrix to act as a barrier to retain sand particles while being permeable. Herein, a volume fraction of the coke-like residue in the consolidated permeable matrix is about 5-30%, preferably 10-25%, preferably 15-20%. That is, when the target region 210 is heated up to the target temperature (as described in the preceding paragraphs), the oxygen-containing gas, such as air, is injected continuously into the subterranean sand formation 200 to oxidize the consolidating fluid 300 remaining in the target region 210 into the coke-like residue, such that the volume fraction of the coke-like residue in the consolidated permeable matrix is about 5-30 vol %.

Figure 5:
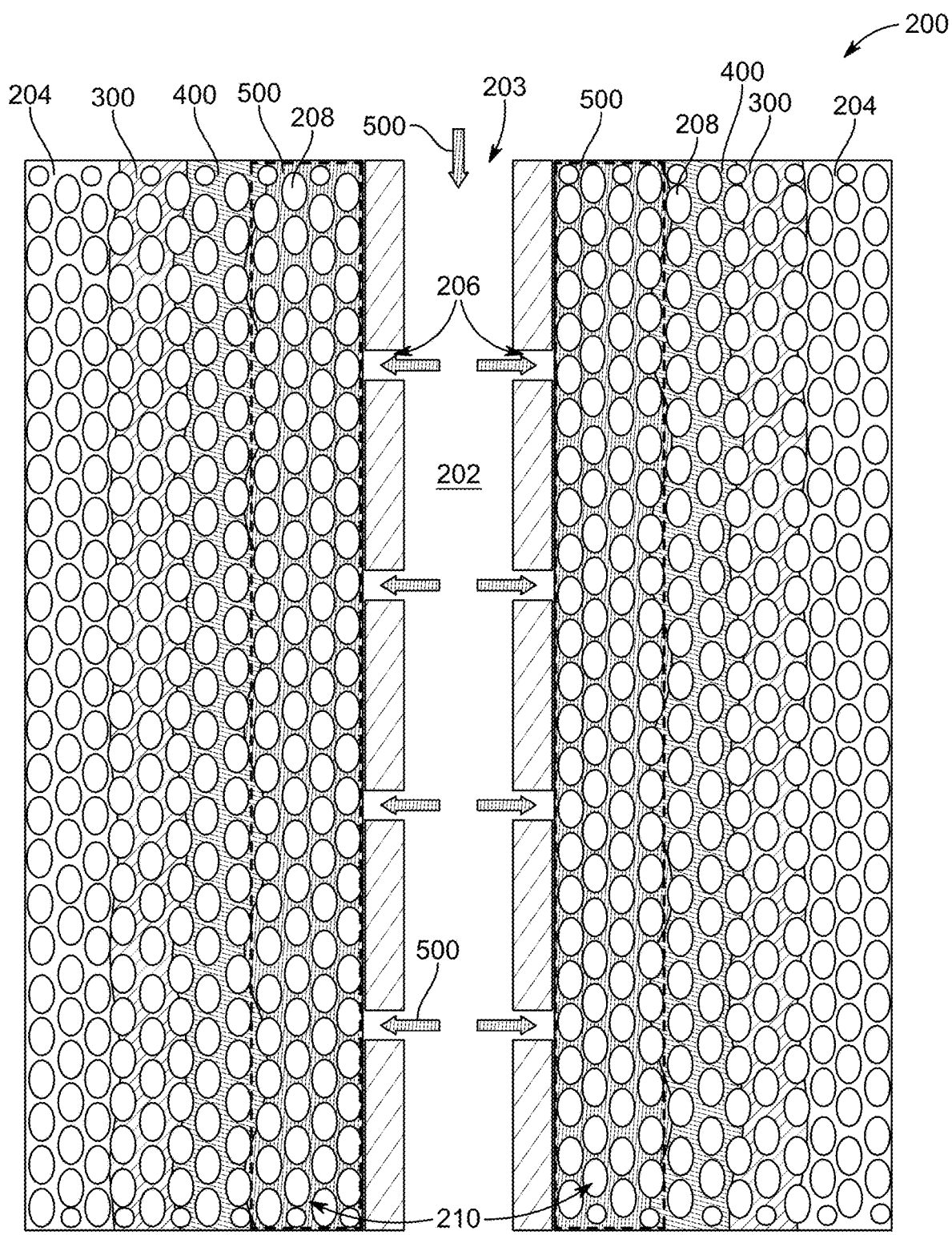
FIG. 5 is an exemplary depiction of the subterranean sand formation with a gas including oxygen being injected in the wellbore, according to certain embodiments.

FIG. 5 is an exemplary depiction of the subterranean sand formation 200 with a gas (depicted as arrows and represented by the reference numeral 500) including oxygen being injected in the wellbore 202, according to certain embodiments. As illustrated in FIG. 5, the gas 500, such as air, is injected continuously into the subterranean sand formation 200 to oxidize at least part of the consolidating fluid 300 remaining in the target region 210 into the coke-like residue. As may be understood, the formed coke-like residue gets deposited on the surfaces of the sand grains in the target region 210. This deposited residue, in turn, binds the sand grains in the target region 210 together into a permeable, solid matrix.

It may be contemplated by a person skilled in the art that due to the high temperature of the target region 210, the oxidation reaction proceeds at a faster rate in comparison to direct oxidation without in-situ heat generation. This, in turn, shortens the duration of the consolidation treatment for the subterranean sand formation 200. In an aspect of the present disclosure, the period for injecting the gas is about 6-10 hours, preferably 6-9 hours or 7-10 hours, preferably 6-8 or 7-9 hours, (in contrast to 24-72 hours for existing techniques). Herein, the air injection is continued for a period of time between about 6 and 10 hours. Such time period may be sufficient to form the coke-like residue with its volume fraction in the consolidated permeable matrix of the target region 210 to about 5-30%, which may be required for achieving the objective of preventing sand production in the subterranean sand formation 200. The achieved consolidated permeable matrix acts as the barrier to restrain the movement of the sand and/or other solid grains during fluid production from the subterranean sand formation 200.

According to aspects of the present disclosure, permeability of the subterranean sand formation 200 is reduced by less than 20%, preferably less than 15%, preferably less than 10%, preferably less than 5%, after injecting the consolidation fluid 300, the composition 400 and the gas 500 in comparison to the permeability of the subterranean sand formation before injecting the consolidation fluid 300, the composition 400 and the gas 500. That is, the permeability of the subterranean sand formation 200 may only be reduced at most by about 20%. It may be appreciated that present method 100 targets poorly-consolidated natural formations, such as the subterranean sand formation 200, that typically show large permeabilities. Therefore, the said reduction in the permeability of the subterranean sand formation 200 caused by the consolidation treatment is usually insignificant and the retained permeability is considered excellent by normal standards.

Permeability is a property of a porous material (such as a rock or an unconsolidated material) to allow fluids (gas or liquid) to pass through. Permeability can be related to porosity of the porous material, shape of the porous material, pressure inside the porous material, etc. Permeability is a property of a porous material (such as a rock or an unconsolidated material) to allow fluids (gas or liquid) to pass through. Permeability can be related to porosity of the porous material, shape of the porous material, pressure inside the porous material, etc. Permeability can be measured in a variety of ways, for example by determining a related mathematical value, such as filtration coefficient, hydraulic conductivity, solute permeability coefficient or osmotic reflection coefficient, as illustrated in Chapter 3 of Regulation of Endothelial Barrier Function by Yuan S Y and Rigor R R (San Rafael, Calif.; Morgan & Claypool Life Sciences; 2010). Further, permeability measurements can be performed based on Darcy's Law, as shown in Permeability Measurement Methods in Porous Media: A Review (ASME IMECE 2008; Boston, Mass.; DVD Proceedings; paper IMECE2008-68543).

Thereby, the present method 100 relates to in-situ sand consolidation as a sand control technique to treat the subterranean sand formation 200 experiencing production of sand and/or other solid particles with the produced fluids. As discussed, the present method 100 utilizes LTO of a hydrocarbon-based material that saturates a region surrounding the wellbore within the formation and extending to about 2 feet in radius. The LTO results in a consolidated sand matrix with high compressive strength as well as high retained permeability. Moreover, the consolidated permeable matrix has sufficient resistance against hydrocarbon and workover fluids. Because conventional techniques are performed at the formation temperature, it may require a relatively long time for completion that could extend up to 72 hours at temperatures typical of incompetent formations, which limits its applicability and economic attractiveness.

The present method 100 shortens the treatment time by pre-heating the target region 210 to accelerate the oxidation process. The method 100 involves in-situ preheating the target region 210 using the exothermic reactions between the heat-generating chemicals of the composition 400, which achieve temperatures within the target region 210 high enough to accelerate the LTO reaction, thus substituting the high-cost incurred in surface heating techniques with inexpensive chemicals. Therefore, the present method 100 introduces an improved technique to shorten the duration of the consolidation treatment so that its implementation becomes cost effective.

Experimental Data

Figure 6:
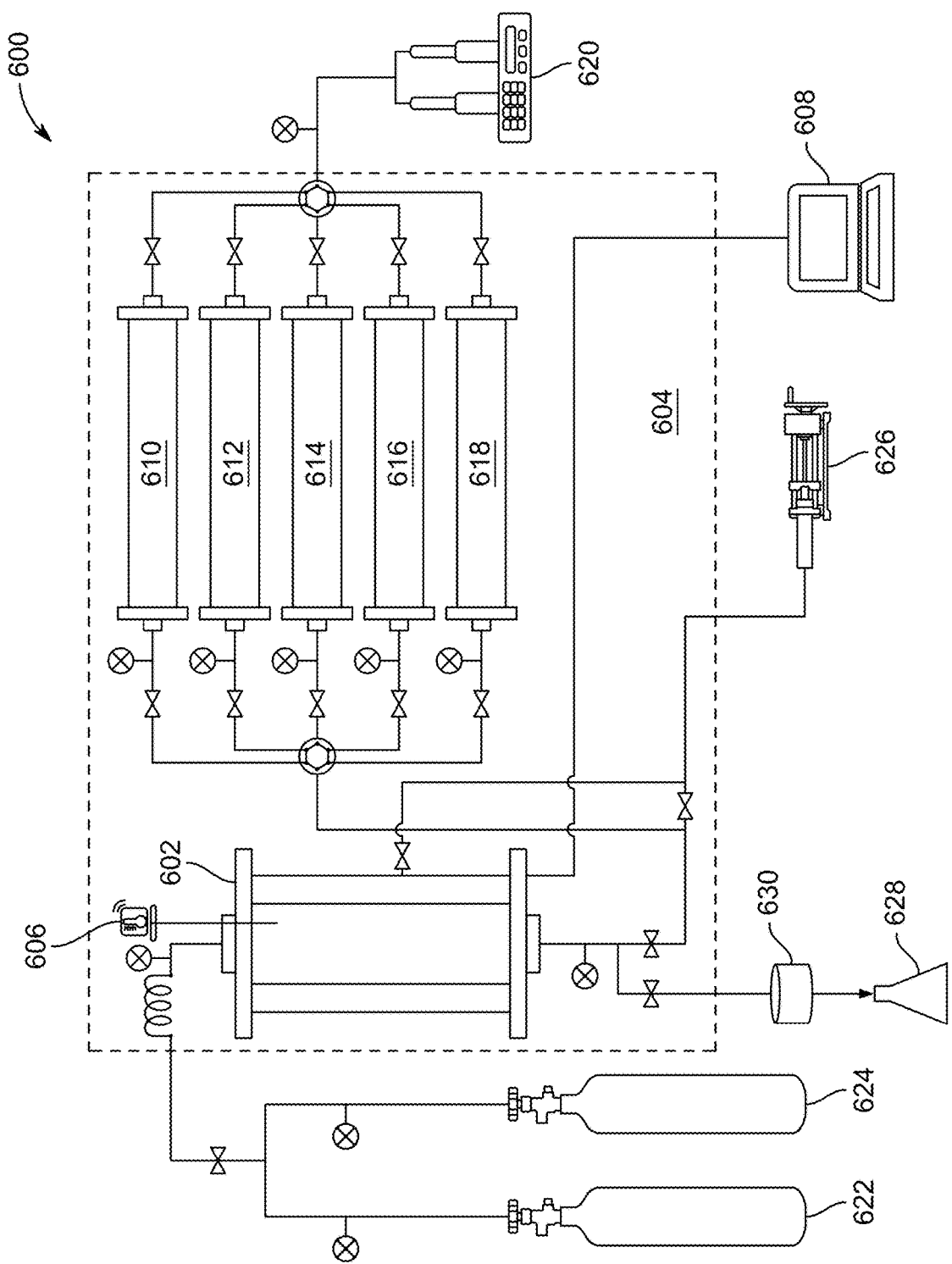
FIG. 6 is an exemplary schematic of an experimental setup for sand consolidation, according to certain embodiments.
Figure 7:
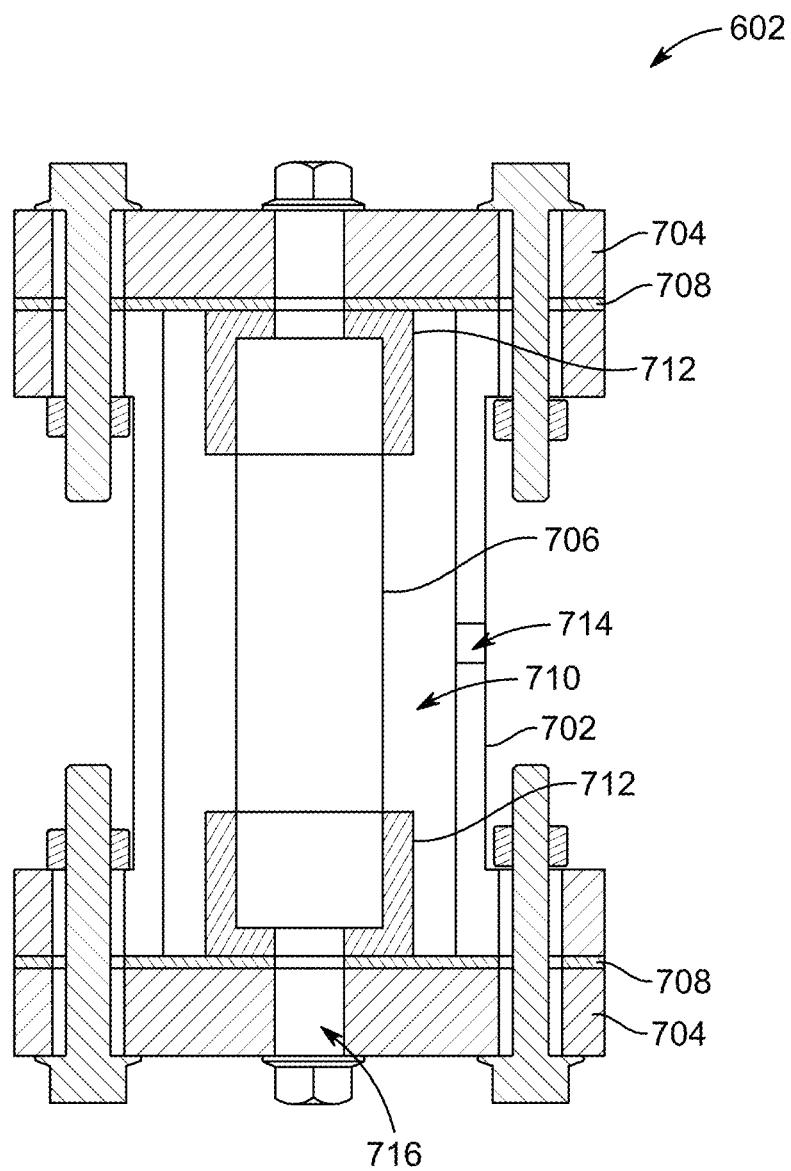
FIG. 7 is an exemplary section view of a consolidation cell used in the experimental setup of FIG. 6, according to certain embodiments.

Referring to FIG. 6, illustrated is an exemplary schematic of an experimental setup 600 for sand consolidation, according to certain embodiments. The experimental setup 600 includes a consolidation cell 602 which allows to simulate the conditions of a natural formation (such as, the subterranean sand formation 200). FIG. 7 is an exemplary section view of the consolidation cell 602 used in the experimental setup 600, according to certain embodiments. As illustrated, the consolidation cell 602 includes a stainless-steel pipe 702 with about 11.43 cm length, 6.08 cm outside diameter and 5.08 cm inside diameter. The stainless-steel pipe 702 may have stainless-steel flanges 704 of about 12.7 outside diameter and 1.5 cm thickness. Further, as illustrated, the consolidation cell 602 may include a stainless-steel tube 706 of 10.16 cm length and 2.54 cm inside diameter placed inside the stainless-steel pipe 702 to define an annulus 710 therein. Both ends of the stainless-steel tube 706 are sealed with gaskets 708 in the form of sealing rubber O-rings against end plugs welded to inner side of each stainless-steel flanges 704. In the consolidation cell 602, the loose sand to be consolidated is packed in the thin-walled stainless-steel tube 706. The stainless-steel tube 706 may be provided with a stainless-steel cap 712 at both of its ends, with stainless-steel cap 712 having about 3.56 cm outside diameter and 2.56 cm inner diameter. As shown, a wall of the stainless-steel pipe 702 may be provided with a threaded port 714 of about 1.27 cm inner diameter, in order to apply vacuum in the annulus 710 for thermal insulation. The stainless-steel pipe 702 may further have an inlet flow conduit 716 to provide the sand to be consolidated in the thin-walled stainless-steel tube 706.

Referring back to FIG. 6, the consolidation cell 602 is placed in an air bath 604. The consolidation cell 602 may be provided with a thermocouple 606 to provide temperature readings inside thereof. In some examples, the thermocouple 606 may be connected to a temperature monitoring system 608 to keep a record of the temperature readings, and take necessary actions based on the same as may be pre-programmed. The experimental setup 600 further includes multiple storage cylinders for storing various compounds required for conducting the experiment, including a first storage cylinder 610 for storing a consolidating fluid (such as, the consolidating fluid 300), a second storage cylinder 612 for storing a first reactant (hereinafter, Reactant A) which is one of the two heat-generating chemicals (like ammonium chloride), a third storage cylinder 614 for storing a second reactant (hereinafter, Reactant B) which is other of the two heat-generating chemicals (like sodium nitrite), a fourth storage cylinder 616 for storing crude oil and a fifth storage cylinder 618 for storing brine (like 3% potassium chloride (KCl)). A syringe pump 620, which may be computer-controlled, is provided to control release of the stored compounds from the respective storage cylinders into the consolidation cell 602 as per the experiment requirement. The experimental setup 600 may also include an air cylinder 622 and a nitrogen ($N_2$) cylinder 624 for providing these gases to the consolidation cell 602. The experimental setup 600 may also include a vacuum pump 626 for creating vacuum condition inside the consolidation cell 602 (as discussed). The experimental setup 600 may further include an effluent collector 628 connected to the consolidation cell 602 via a back-pressure regulator 630, to remove effluents therefrom. Further, as shown, the experimental setup 600 may include one or more of flow, temperature, and pressure controllers (not labelled) to regulate experimental conditions.

An experimental program was developed over two stages to identify the framework of employing the in-situ heating technique for accelerating the consolidation process. The first stage involved consolidating different loose sand packs at different oxidation temperatures and times to investigate the consolidation conditions. The sand packs used were 1 inch in diameter and 8.5 inches long packed with clean sand having a grain-size distribution prepared to resemble that of a reservoir in the Middle East experiencing sand production. The sand packs were saturated with a solution of bitumen in toluene (similar to the consolidating fluid 300). The concentration of asphaltenes in the consolidating fluid 300 were about 40 grams per 100 ml of toluene. The bitumen is dissolved in toluene to reduce its viscosity and facilitate its injectivity into the sand pack. In this stage, the saturated sand packs were first heated to a test temperature by an external heating source such as an oven or air bath, and then flooded with air. The consolidation conditions were decided to be the minimum oxidation temperature and time sufficient to effectively oxidize the consolidating fluid 300 into the coke-like residue present on the sand grains and, hence, consolidate the matrix. These conditions were found to be about 6 hours of air flow at about 180° C.

After determining the consolidation temperature and time, the second stage proceeded by first heating the saturated sand pack in the consolidation cell 602 by the external heat source to a temperature of 75° C., which simulates a normal temperature of natural formation (i.e., the subterranean sand formation 200). This is achieved by setting temperature of the air bath 604 to about 75° C. to simulate a somewhat shallow oil reservoir. The temperature of the sand pack in the consolidation cell 602 was then raised gradually by injecting thermochemicals. The thermochemicals used were ammonium chloride and sodium nitrite solutions; each at 3 molar concentration. Further, acetic acid was added to the ammonium chloride solution to act as the acidic activator. Specifically, when temperature of the sand pack stabilized at temperature of the air bath 604, thermochemicals (3 molar concentration solutions of ammonium chloride (Reactant A) mixed with acetic acid as the acidic activator and sodium nitrite (Reactant B)) were delivered simultaneously from the respective second storage cylinder 612 and the third storage cylinder 614 by separate lines to the sand pack at equal rates of 0.5 cm$^3$/min. By reducing the pH of the medium below 4, the acidic activator triggered the exothermic reaction when the two reactants mix within the sand pack, and the heat of the reaction was measured to be 334.2 kJ/mole at 25° C.

Figure 8:
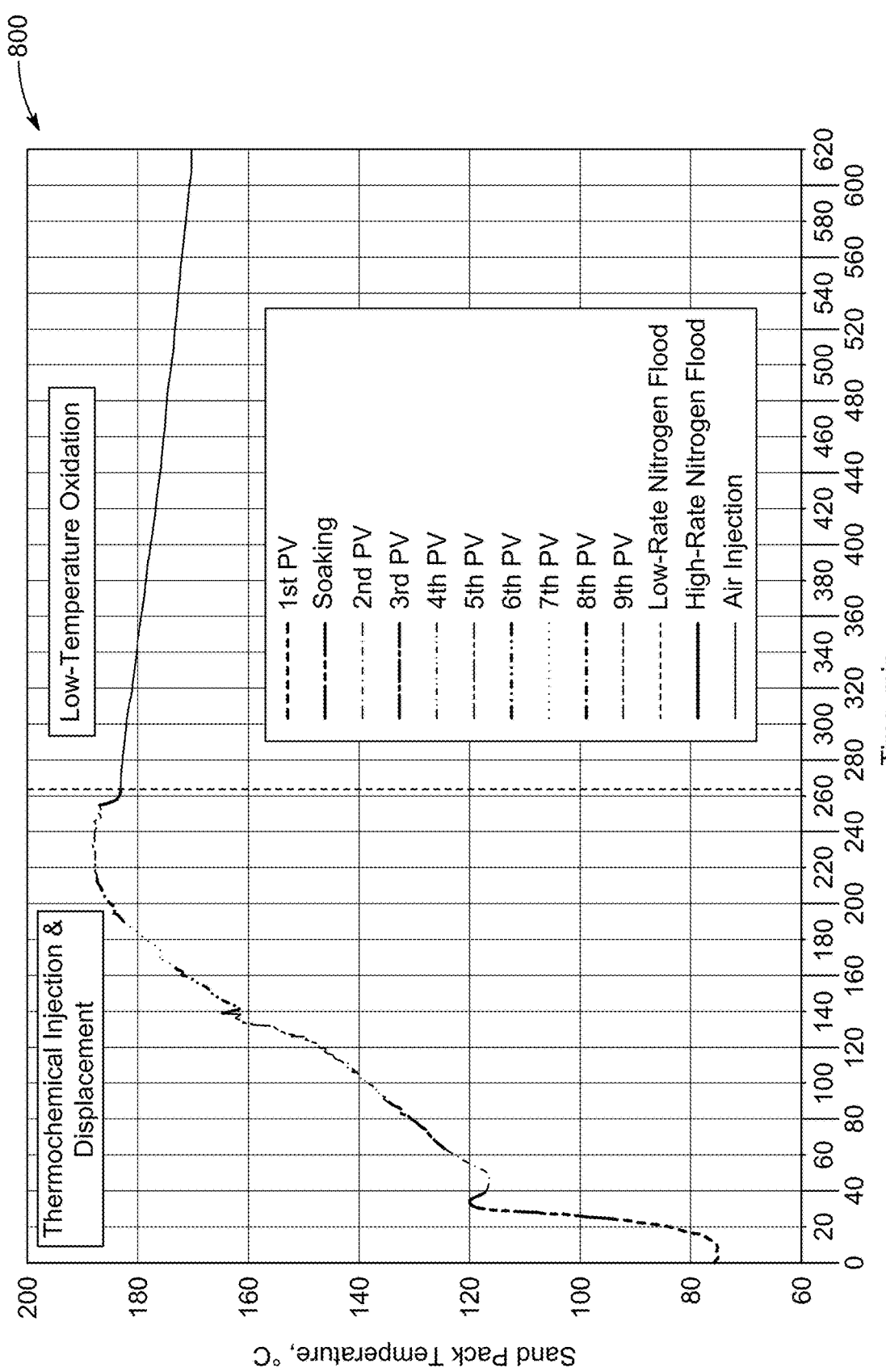
FIG. 8 is an exemplary graphical illustration depicting change in sand pack temperature over time during consolidation treatment in the experimental setup of FIG. 6, according to certain embodiments.

As discussed, in field applications, Reactant A should not contain the acidic activator, which should be injected after the thermochemicals are delivered to the formation. Therefore, after half a pore volume (PV) of each thermochemical was injected, the sand pack was left to soak the thermochemicals while monitoring the rise in its temperature. FIG. 8 is an exemplary graphical illustration 800 depicting change in sand pack temperature over time during consolidation treatment in the experimental setup 600, according to certain embodiments. As may be seen from the graphical illustration 800 of FIG. 8, when the temperature stabilized, usually after 40 minutes, another slug of thermochemicals was injected. This intermittent injection of thermochemicals was repeated several times until a sand-pack temperature of 188° C. was reached as indicated by the plateau in the temperature curve at about 240 minutes (See FIG. 8). This temperature was achieved with about 8 PVs of the thermochemicals. As may be seen from the graphical illustration 800, further injection of the thermochemicals did not elevate the sand-pack temperature anymore. Approximately 8 sand-pack pore volumes (PVs) of the thermochemicals were injected into the sand pack in stages, which raised the sand pack's temperature to 188° C. To remove all excess liquids from the sand pack, the consolidation cell 602 was then flooded with nitrogen (from the nitrogen cylinder 624) first at low rate then at high rate for a total of 20 minutes. Air injection was then started (from the air cylinder 622) and continued for about 6 hours. The oxidation phase then commenced by continuous air injection for 6 hours.

Figure 9:
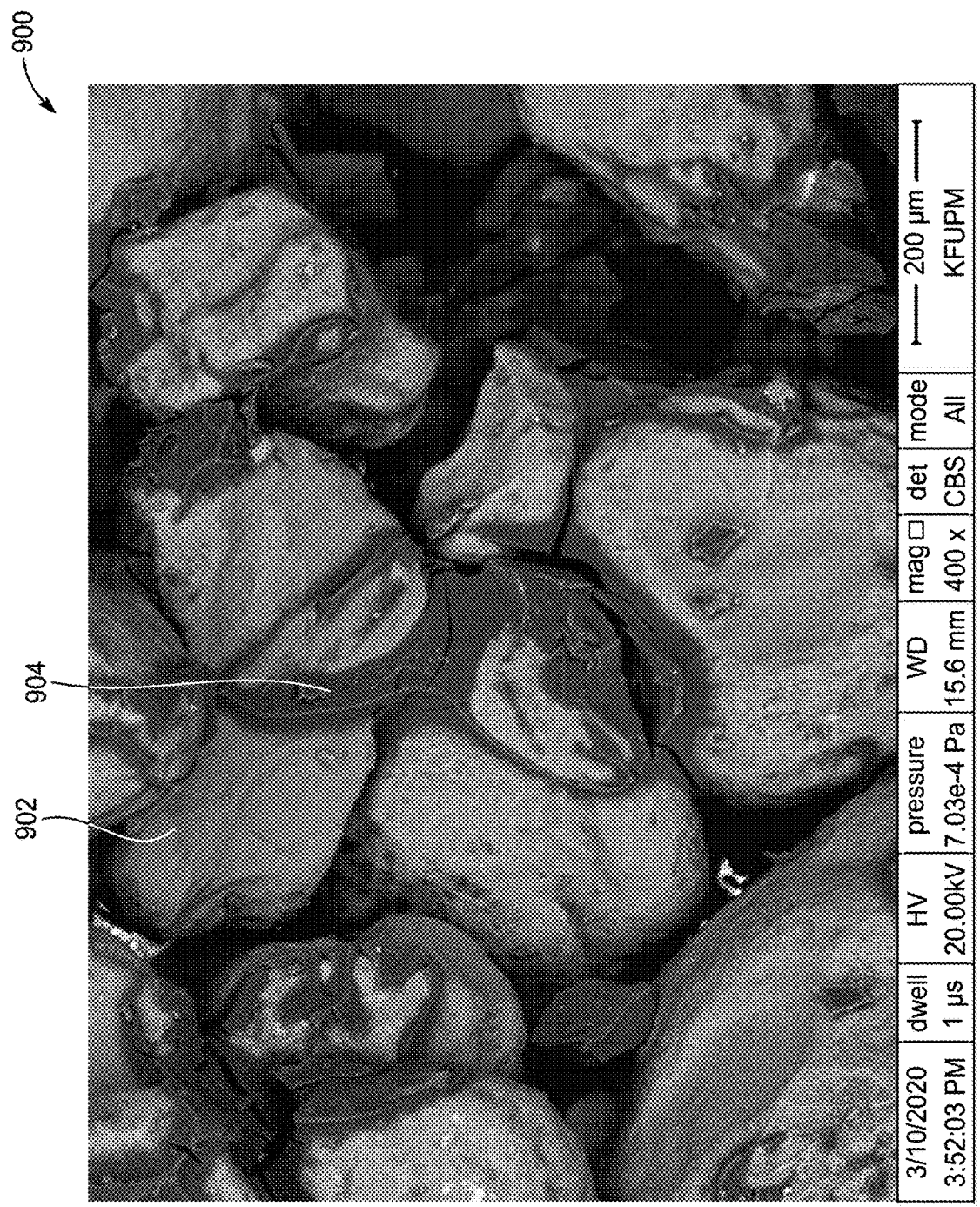
FIG. 9 is an exemplary Scanning Electron Microscopy (SEM) image of a consolidated sand pack produced in the experimental setup of FIG. 6, according to certain embodiments.

After the oxidation phase, the consolidated sand pack was left to cool down, and then removed from the cell to have its compressive strength measured. Post consolidation tests on all sand packs showed compressive strengths in excess of 1500 psi. Further, no deterioration was detected when the consolidated sand packs were soaked in hydrochloric acid, crude oil or aromatic solvents. FIG. 9 is an exemplary Scanning Electron Microscopy (SEM) image 900 of a consolidated sand pack produced in the experimental setup 600, according to certain embodiments. As may be seen, the SEM image 900 of the consolidated sand packs reveals sand grains 902 with a consolidating coke-like residue 904 binding the sand grains together.

The results show that the process of the present method 100 accelerates oxidation for consolidation of incompetent formations, shortening the air injection phase to about 6 hours. The method 100 provides details for scaling the results. According to aspects of the present method 100, the subterranean sand formation 200 is treated by first injecting a quantity of the consolidating fluid 300 sufficient to saturate the target region 210 surrounding the wellbore 202 and extending up to about 2 feet in radius. Next, the composition 400 with the thermochemicals is injected into the subterranean sand formation 200 at a ratio of about 7 bbl per each foot of the thickness of the subterranean sand formation 200 and depending on the porosity of the subterranean sand formation 200. Finally, the gas 500 (air) is injected into the subterranean sand formation 200 to turn the target region 210 surrounding the wellbore 202 into consolidated rock. The method 100 reduces the consolidation time and further enhances the quality of sand consolidation, and therefore improves the cost efficiency and durability of the sand control technique.

The embodiments of the present disclosure are illustrated with respect to FIG. 1 through FIG. 9. The embodiments describe the method 100 of sand consolidation. The method 100 comprises injecting the consolidating fluid 300 into the subterranean sand formation 200 via the wellbore 202 to saturate the portion of the subterranean sand formation 200 in the target region 210 surrounding the wellbore 202 and displace the formation fluid 204 present in the subterranean sand formation 200, wherein the consolidating fluid 300 comprises bitumen dissolved in the aromatic solvent; injecting the composition 400 comprising one or more heat-generating chemicals into the subterranean sand formation 200 such that the portion of the subterranean sand formation 200 in the target region 210 is heated to the target temperature of at least 150° C., the one or more heat-generating chemicals diluting the consolidating fluid 300 in the target region 210; and injecting the gas 500 comprising oxygen into the subterranean sand formation 200 for the period sufficient to oxidize the bitumen into the coke-like residue 904 deposited on sand grains 902 of the subterranean sand formation 200 to bind the sand grains 902 together into the consolidated permeable matrix to act as the barrier to retain sand particles while being permeable, wherein the volume fraction of the coke-like residue 904 in the consolidated permeable matrix is about 5-30%.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of sand consolidation, the method comprising:

injecting a consolidating fluid into a subterranean sand formation via a wellbore to saturate a portion of the subterranean sand formation in a target region surrounding the wellbore and displace a formation fluid present in the subterranean sand formation, wherein the consolidating fluid comprises bitumen dissolved in an aromatic solvent;

injecting a composition comprising one or more heat-generating chemicals into the subterranean sand formation such that the portion of the subterranean sand formation in the target region is heated to a target temperature of from 150° C. to 220° C., the one or more heat-generating chemicals diluting the consolidating fluid in the target region; and injecting a gas comprising oxygen into the subterranean sand formation for a period sufficient to oxidize the bitumen in the target region into a residue present on sand grains of the subterranean sand formation to bind the sand grains together into a consolidated permeable matrix, wherein a volume fraction of the residue in the consolidated permeable matrix in the target region is about 5-30%, and wherein the injecting the composition comprises injecting ammonium and nitrite.

2. The method of claim 1, further comprising injecting an acidic activator comprising acetic acid to activate an exothermal reaction between the ammonium and the nitrite.

3. The method of claim 2, wherein:
the ammonium and the nitrite are injected into the subterranean sand formation to form a mixture therein, and
the acidic activator is injected into the mixture.

4. The method of claim 3, wherein:
the ammonium and the nitrite are injected into the subterranean sand formation in batches to form batches of mixtures, and
the acidic activator is injected into each batch of mixtures.

5. The method of claim 2, wherein the ammonium and the nitrite are injected separately into the subterranean sand formation.

6. The method of claim 5, wherein the acidic activator is pre-mixed with one of the ammonium and the nitrite before injecting into the subterranean sand formation.

7. The method of claim 2, wherein the acidic activator has a concentration of 7-13% by volume of a total volume of the ammonium and the nitrite.

8. The method of claim 1, wherein:
the ammonium comprises ammonium chloride, and
the nitrite comprises sodium nitrite.

9. The method of claim 8, wherein:
the ammonium comprises 2-4 mol/L ammonium chloride, and
the nitrite comprises 2-4 mol/L sodium nitrite.

10. The method of claim 1, wherein permeability of the subterranean sand formation is reduced by less than 20% after injecting the consolidating fluid, the composition and the gas in comparison to the permeability of the subterranean sand formation before injecting the consolidating fluid, the composition and the gas.

11. The method of claim 1, wherein the aromatic solvent comprises toluene or xylene.

12. The method of claim 1, wherein the target region extends radially from the wellbore to the subterranean sand formation by up to 4 feet.

13. The method of claim 1, wherein the period for injecting the gas is about 6-10 hours.

14. The method of claim 1, wherein the injecting the composition comprises injecting 6-8 bbl of the heat-generating chemicals per each foot of a thickness of the subterranean sand formation.

15. The method of claim 1, prior to the injecting the consolidating fluid into the subterranean sand formation, the method further comprising:

flushing the target region with a mutual solvent to at least partially remove the formation fluid from the target region.

16. The method of claim 1, wherein the formation fluid comprises water, crude oil, gas or a combination thereof.

17. The method of claim 1, wherein the subterranean sand formation comprises carbonate minerals.

* * * * *